United States Patent [19]
Czerniak

[11] 3,935,487
[45] Jan. 27, 1976

[54] PERMANENT MAGNET MOTOR

[76] Inventor: Leonard C. Czerniak, 2459 Eastgate Road, Toledo, Ohio 43614

[22] Filed: May 6, 1974

[21] Appl. No.: 467,006

[52] U.S. Cl. .................................. 310/46; 310/103
[51] Int. Cl.² ......................................... H02K 49/10
[58] Field of Search ............. 310/46, 103, 154, 156

[56] References Cited
UNITED STATES PATENTS

| | | | |
|---|---|---|---|
| 1,724,446 | 8/1929 | Worthington | 310/46 |
| 1,859,643 | 5/1932 | Worthington | 310/46 |
| 1,863,294 | 6/1932 | Bogia | 310/46 |
| 3,670,189 | 6/1972 | Monroe | 310/46 |
| 3,703,653 | 11/1972 | Tracy et al. | 310/103 X |
| 3,811,058 | 5/1974 | Kiniski | 310/103 X |

*Primary Examiner*—Donovan F. Duggan
*Attorney, Agent, or Firm*—David H. Wilson

[57] ABSTRACT

A permanent magnet motor which generates mechanical output power by the repulsion forces between a movable permanent magnet and a fixed permanent magnet. A movable magnetic shield is interposed between the magnets when they are adjacent one another and then the shield is moved to expose the fixed magnet as the movable magnet passes by. A second fixed magnet can be added to increase the output power by attracting the movable magnet as it approaches. The movable magnetic shield is interposed between the movable magnet and the second fixed magnet when they are adjacent one another.

11 Claims, 12 Drawing Figures

PERMANENT MAGNET MOTOR

BACKGROUND OF THE INVENTION

1. Field of the Invention

This invention relates to permanent magnet motors in general and more particularly to such a motor having a movable magnet which interacts with a fixed magnet to produce mechanical output power.

2. Description of the Prior Art

Many prior art motors have utilized movable permanent magnets with stationary wound fields or stationary permanent magnets with movable wound fields, wherein the windings are electrically energized. If the windings are energized from a direct current source, such as a battery, the current must be commutated to either reverse the polarity of the fields created by the windings or to interrupt these fields so that relative motion can be obtained between the permanent magnets and the wound fields. In a relatively large motor such switching causes rapid brush and commutator wear or requires expensive solidstate switching controls.

SUMMARY OF THE INVENTION

The present invention involves a permanent magnet motor having a movable permanent magnet which is repelled by a fixed permanent magnet to produce mechanical output power. As the movable magnet approaches the fixed magnet, a magnetic shield is interposed between them until the movable magnet passes slightly beyond the fixed magnet at which time the shield is removed to expose the fixed magnet which repels the movable magnet. A second fixed magnet may be added to attract the movable magnet as it approaches. Then the shield moves to shield the second magnet as the movable magnet passes by.

In one form of the invention, the movable magnet may be attached to a rotor shaft which drives an output shaft through a set of gears. The magnetic shield is attached to the output shaft and rotates through the air gap between the movable and fixed magnets. In another embodiment, the movable magnet is attached to a plate which rotates on a shaft concentric with a shaft on which the shield rotates in an opposite direction in the air gap between the movable magnet and the fixed magnet.

It is an object of the present invention to reduce the amount of current required to operate a direct current motor.

Another object of the present invention is to increase the efficiency of electric motors utilizing permanent magnets.

A third object of the present invention is to decrease the size of the windings required in an electric motor.

DESCRIPTION OF THE PREFERRED EMBODIMENT

The present invention involves a permanent magnet motor having at least one movable permanent magnet which is repelled by a fixed permanent magnet to drive an output shaft. A magnetic shield attached to the output shaft moves to shield the fixed magnet as the movable magnet approaches and moves to expose the fixed magnet as the movable magnet passes by. An additional fixed magnet may be provided which is exposed to attract the movable magnet as it approaches and is shielded by the magnetic shield as the movable magnet passes by. A fixed magnetic shield is positioned adjacent the movable magnet and has electromagnets formed thereon. Since the movable magnets tend to be attracted to a magnetic neutral position, the electromagnets are energized to start the motor and to overcome the mechanical and magnetic losses of the rotating motor.

Figure 1:
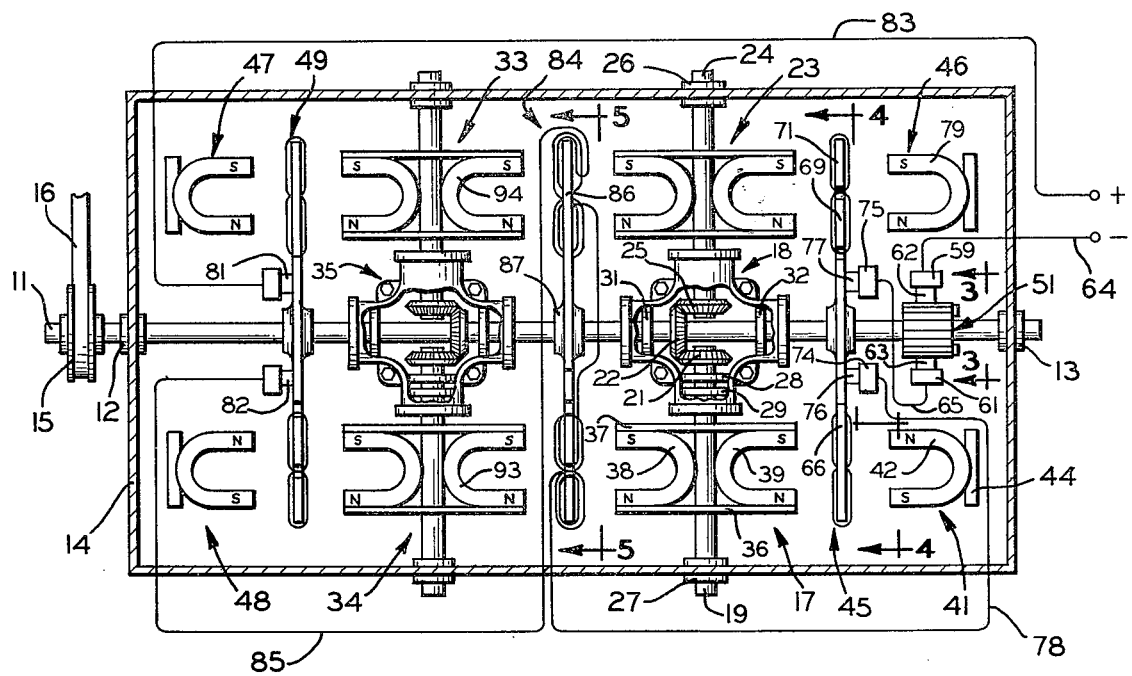
FIG. 1 is a top plan view of the present invention with a portion of a gear case broken away.
Figure 2:
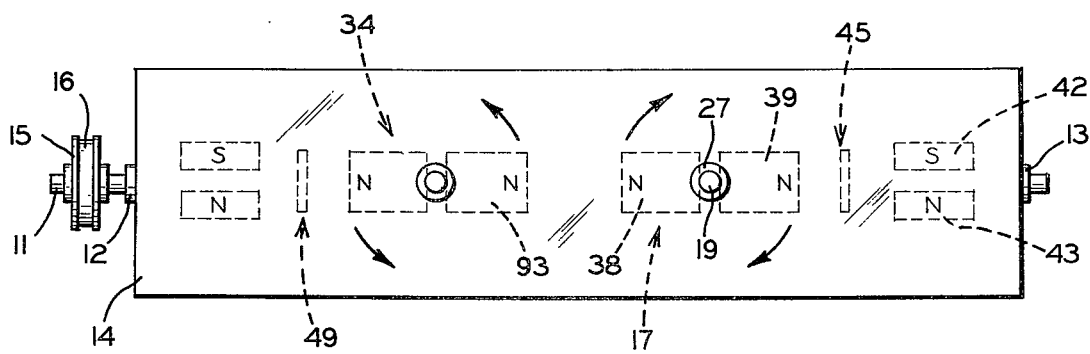
FIG. 2 is a front elevation view of the invention of FIG. 1 showing the positioning of the permanent magnets.

Referring to FIGS. 1 and 2, there is shown a permanent magnet motor embodying the present invention. An output shaft 11 is rotatably supported by a pair of bearings 12 and 13 which are attached to a supporting frame 14. The rotational mechanical power generated by the motor may be transmitted by suitable transmission means, typically a pulley 15 and a belt 16 or a gear box (not shown), to power various devices. The output shaft 11 is rotated by at least one rotor assembly, such as rotor assembly 17 which is coupled to the output shaft 11 by a gear case 18. The gear case 18 has been broken away to show the connection between the output shaft 11 and the rotor assembly 17. The rotor assembly 17 has a rotor shaft 19 which extends into the gear case 18 and has a bevel gear 21 attached thereto. The bevel gear 21 engages a similar bevel gear 22 attached to the output shaft 11. If it is assumed that the rotor assembly 17 rotates in a clockwise direction, as shown in FIG. 2, then the output shaft 11 will be driven in a counter clockwise direction as viewed from the end of the shaft having the pulley 15 attached thereto. The gearing has a one-to-one ratio so that one rotation of the rotor shaft 19 will produce one rotation of the output shaft 11.

Although the present invention will operate in the manner to be disclosed to generate output power, an additional rotor assembly 23 may be added to reduce mechanical vibrations and to increase the output power. The rotor assembly 23 has a rotor shaft 24 which extends into the gear case 18 and has a bevel gear 25 attached thereto. The bevel gear 25 engages the bevel gear 22 and drives the output shaft 11 in a counter clockwise direction as the rotor assembly 23 rotates in a clockwise direction as viewed from the end of the rotor shaft 24 which is rotatably supported by a bearing 26 attached to the supporting frame 14.

The rotor shaft 19 is rotatably supported at one end by bearing 27 which is attached to the supporting frame 14. Adjacent the bevel gear 21 inside the gear case 18 is a bearing 28 which in cooperation with a bearing 29 supports the opposite end of the rotor shaft 19. The end of the rotor shaft 24 which extends into the gear case 18 is also supported by a pair of bearings (not shown). The output shaft 11 is rotatably supported by a pair of bearings 31 and 32 inside the gear case 18.

As shown in FIG. 1, the output power may be further increased by adding a pair of rotor assemblies 33 and 34 which are coupled to the output shaft 11 through a gear case 35. The gear case 35 is similar to the gear case 18 except that the bevel gear that is attached to the output shaft 11 is positioned so as to engage the bevel gears attached to the rotor assemblies 33 and 34 from the side opposite that shown for bevel gear 22. Therefore, rotor assembly 34 must rotate in a counter clockwise direction, as seen in FIG. 2, and rotor assembly 33 must also rotate in a counter clockwise direction, as viewed from the end of its rotor shaft which is rotatably attached to the supporting frame 14, to drive the output shaft 11 in a counter clockwise direction as viewed from the end to which the pulley 15 is attached. The opposite directions of rotation for the rotor assemblies 17 and 34 and for the rotor assemblies 23 and 33 tend to balance any mechanical vibrations which might be generated.

The rotor assembly 17 includes a pair of spaced apart retaining plates 36 and 37 which are attached to the rotor shaft 19. A pair of horseshoe-shaped permanent magnets 38 and 39 are attached to the retaining plates 36 and 37 in back-to-back relationship 180° apart about the circumference of the rotor shaft 19. Although horeshoe-shaped magnets are illustrated it will be appreciated that magnets of other shapes may be utilized without departing from the scope of the present invention. The polarity of each end portion of the magnets is designated by an "N" for a north pole and an "S" for a south pole. As shown in FIG. 1, like poles are attached to the same retaining plate so that the shortest magnetic path between poles of dissimilar polarity is through the air gap between poles of the same magnet. Adjacent the rotor assembly 17 is a fixed magnet assembly 41 which is attached to the supporting frame 14. A pair of horseshoe-shaped permanent magnets 42 and 43 are attached to a bracket 44 which in turn is attached to the supporting frame 14. The fixed permanent magnets 42 and 43 have their end portions opposite the end portions of the permanent magnet 38 when it rotates into the position occupied by the permanent magnet 39 in FIGS. 1 and 2. The end portions of the rotatable and fixed permanent magnets are separated by an air gap through which a magnetic shield 45 is rotated. As shown in FIG. 2, the north pole of the fixed magnet 43 is adjacent the north poles of the rotating magnets 38 and 39. Although not shown, the south pole of the fixed magnet 43 will be adjacent the south poles of the rotating magnets 38 and 39. Therefore, the magnetic force generated by the fixed magnet 43 will oppose the magnetic forces generated by the rotating magnets 38 and 39 so that the magnets 38 and 39 will be repelled with greater force the closer they are to fixed magnet 43. This repelling force may be utilized to impart clockwise rotating motion to the rotor assembly 17 if the fixed magnet 43 is shielded from the rotating magnets 38 and 39 as they approach and then is exposed to the rotating magnets as they begin to rotate away.

A magnetic shield 45, typically formed of a ferromagnetic material, is attached to the output shaft 11 and therefore rotates with it. Thus, as the rotating magnets move from the fixed magnet 42 to the fixed magnet 43, the magnetic shield 45 moves in the opposite direction as shown in FIG. 2. As the rotating magnet 39 approaches the fixed magnet 43, the magnetic shield 45 enters the air gap and shields the rotating magnet 39 from the repelling magnetic force of the fixed magnet 43. The rotating magnet is also attracted to the shield 45 since the ferromagnetic shield material provides a relatively low reluctance magnetic path. As the rotating magnet 39 passes the horizontal center position as defined by the centerline of the output shaft 11, the magnetic shield 45 moves toward the fixed magnet 42 thereby exposing the fixed magnet 43 and repelling the rotating magnet 39 in a clockwise direction. This sequence of events is repeated as the rotating magnet 38 approaches the fixed magnets.

The fixed permanent magnet 42 may be added to increase the power output of the rotor assembly 17. As is shown in FIG. 2, the south pole of the fixed permanent magnet 42 is adjacent the north poles of the rotating magnets 38 and 39 as they rotate past. Although not shown, the north pole of the fixed magnet 42 will be adjacent the south poles of the rotating magnets 38 and 39. Therefore, the magnetic force generated by the fixed magnet 42 will complement the magnetic forces generated by the rotating magnets 38 and 39 so that the magnets 38 and 39 will be attracted with greater force the closer they are to the fixed magnet 42. As the rotating magnet 39 approaches the fixed magnet 42 it is attracted thereby imparting clockwise rotational motion to the rotor assembly 17. As the rotating magnet 39 passes the horizontal center position, the magnetic shield moves between the magnets 39 and 42 thereby shielding the attracting forces from one another. Then as the rotating magnet 38 passes the fixed magnet assembly 41, the opposite end of the magnet shield will first expose an then shield the fixed magnet 42.

Each of the rotor assemblies 23, 33 and 34 cooperates in a similar manner with a fixed magnet assembly, 46, 47 and 48 respectively. In addition, a magnetic shield 49 is attached to the output shaft 11 and rotates through the air gap between the rotor assembly 33 and the fixed magnet assembly 47 and the air gap between the rotor assembly 34 and the fixed magnet assembly 48. Therefore, the output power of the permanent magnet motor shown in FIGS. 1 and 2 is generated by the attraction and repulsion between the rotating magnets and the fixed magnets wherein each rotating magnet is first exposed to an attracting fixed magnet and shielded from a repelling fixed magnet and then shielded from the attracting fixed magnet and exposed to the repelling fixed magnet so as to impart rotary motion to an output shaft.

Figure 3:
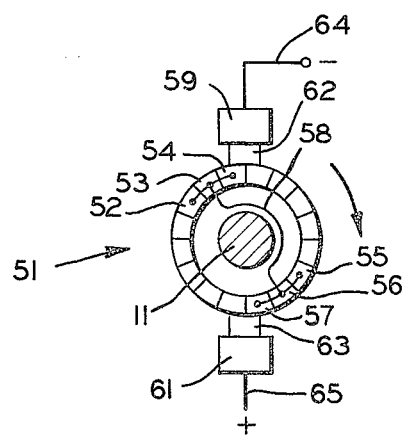
FIG. 3 is a fragmentary sectional view taken along line 3—3 of FIG. 1 showing the commutator and brushes.
Figure 4:
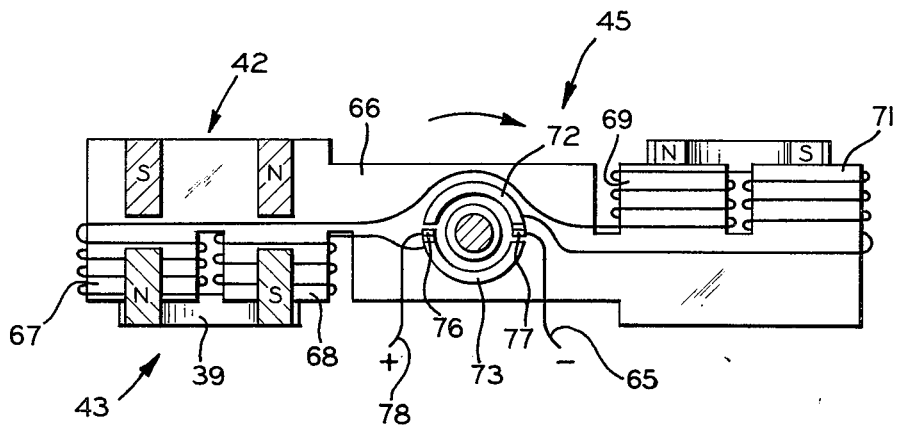
FIG. 4 is a fragmentary sectional view taken along line 4—4 of FIG. 1 showing the relationships between the fixed and movable magnets and the movable magnetic shield.
Figure 5:
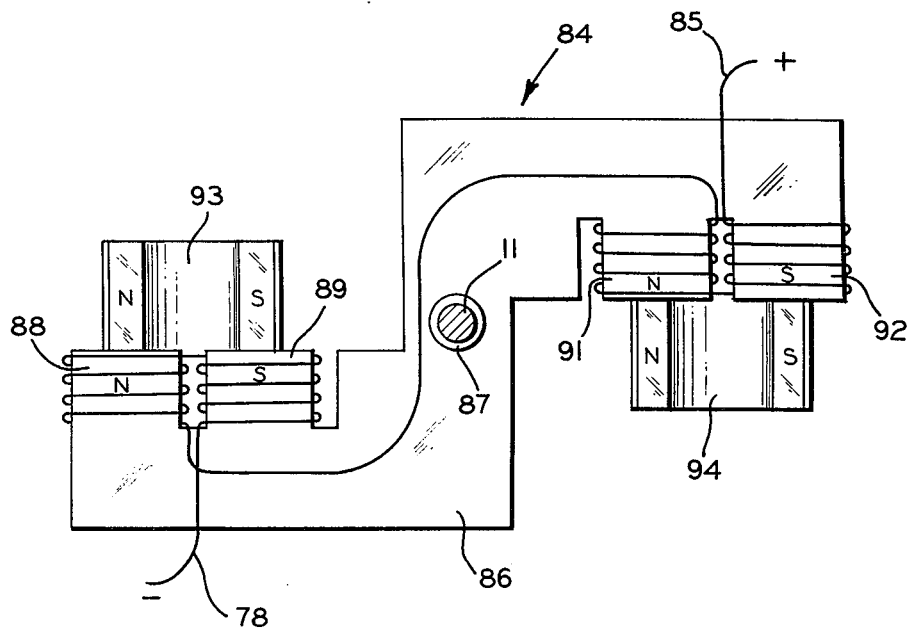
FIG. 5 is a fragmentary sectional view taken along line 5—5 of FIG. 1 showing the relationship between the movable permanent magnets and the fixed magnetic shield.

Additional output power may be generated by adding electro-magnets to the present invention which are energized for a portion of the path of rotation of the output shaft 11. FIGS. 3, 4 and 5 are fragmentary sectional views taken along lines 3—3, 4—4 and 5—5 of FIG. 1 which show portions of the electromagnetic circuit of the present invention. FIG. 3 shows a commutator 51 attached to the output shaft 11 and having a plurality of commutator bars which are insulated from one another. If one or more bars on opposite sides of the commutator are connected together a current path may be established during a portion of the path of rotation of the output shaft 11. For example, commutator has sixteen commutator bars with a group of three bars 52, 53 and 54 connected together electrically on one side and opposite a group of three more bars 55, 56 and 57 connected together electrically. A connecting conductor 58 is electrically connected to the bars 53 and 56 to provide an electrical path between the opposite groups of three bars. A pair of brush holders 59 and 61 retain a pair of brushes 62 and 63 respectively. The brushes 62 and 63 contact the commutator bars as the commutator 51 rotates with the output shaft to switch on and off an electrical current which energizes the electromagnets. The brush 62 is connected to an input line 64 which is supplied from the negative terminal of a direct current power source (not shown). The brush 63 is connected to a line 65 which is connected to the positive terminal of the same direct current power source through the electromagnet windings. As the output shaft 11 rotates, electric current will flow between the brushes 63 and 62 only when those brushes are in contact with the commutator bars 52 to 57. For example, the brush 63 will be in electrical contact with the brush 62 when the brush 63 contacts the bar 57 and the brush 62 contacts the bar 54 and they will remain in electrical contact until the brush 63 ceases to be in contact with the bar 55 and the brush 62 ceases to be in contact with the bar 52. Therefore, the period of energization of the electromagnets is determined by the number of bars on the commutator, the number of those bars which are in electrical contact with one another and the width of the brushes. Although, in FIG. 3 the commutator 51 is shown with 16 bars of which six are in electrical contact with one another for current flow between the brushes for 67.5° during every half revolution, other numbers of bars may be utilized to obtain similar performance.

FIG. 4 is a fragmentary sectional view taken along line 4—4 of FIG. 1 showing the rotatable magnetic shield 45. The shield 45 comprises a shield plate 66 which has electromagnet core portions 67, 68, 69 and 71 formed thereon and a pair of semi-circular brush tracks 72 and 73 which are electrically insulated from the shield plate 66. Referring to FIGS. 1 and 4, a pair of brush holders 74 and 75 retain a pair of brushes 76 and 77 which alternately contact the brush tracks 72 and 73 as the magnetic shield plate 66 is rotated except during a portion of the circular path when shield plate 66 is adjacent the fixed magnets 42 and 43 as shown in FIG. 4. Each of the core portions 67, 68, 69 and 71 has a winding formed thereon and the windings are connected in series between the brush tracks 72 and 73. Brush 76 is connected to the positive terminal of the direct current power source through line 78 while brush 77 is connected to the negative terminal of the power source by line 65 through the commutator 51. As the magnetic shield 45 approaches registry with the fixed magnets 42 and 43, the brushes 62 and 63 contact the commutator 54 and 57 of the commutator 51 of FIG. 3 to connect the brush 77 to the negative terminal of the power supply. Current will flow into the line 78 from the positive terminal of the power supply to the brush 76, through the brush track 73 and the electromagnet windings to the brush track 72, to the brush 77 and out of the line 65, through the commutator 51 to the negative terminal of the power supply.

The current flow in the windings produces a north pole at the core portions 67 and 69 and a south pole at the core portions 68 and 71. Therefore, the magnetic shield 45 will be repelled by the fixed magnet 43 and an upper fixed magnet 79 of the fixed magnet assembly. The magnetic shield 45 will also be repelled by the rotating magnet 39 and the rotating magnet of the rotor assembly 23. The position of the bars on the commutator 51 which are electrically connected will determine when the electromagnetic windings are energized and the insulating gaps between the brush tracks 72 and 73 will switch the current off slightly before the horizontal center position. The bars 54 and 57 should coincide with the insulating gaps so that the windings will not be energized until the core portions 67 and 68 are in registry with the fixed magnets 42 and 43. The rotatable magnetic shield 49 also has electromagnets thereon which are energized from a pair of brushes 81 and 82 at the same time that the electromagnet windings of the magnetic shield 45 are energized. The electromagnets of the magnetic shield 49 are repelled by a fixed magnet in each of the fixed magnet assemblies 47 and 48 and by the rotating magnets of the rotor assemblies 33 and 34 to provide additional power output. An input line 83 is connected between the brush 81 and the positive terminal of the direct current power supply.

FIG. 5 is a fragmentary sectional view taken along line 5—5 of FIG. 1 showing a fixed magnetic shield 84 having electromagnet windings connected in series between the electromagnet windings of the rotatable magnetic shields 45 and 49 by the line 78 and a line 85 from the brush 82. The fixed magnetic shield comprises a shield plate 86 attached to the supporting frame 14 and having a bearing 87 in which the shaft 11 is free to rotate. The shield plate 86 has formed thereon electromagnet core portions 88, 89, 91 and 92 with windings connected in series between the lines 78 and 85. Current will flow from the line 85 to the line 78 when the electromagnet windings of the rotatable magnetic shields 45 and 49 are energized to produce a north pole at the core portions 88 and 91 and a south pole at the core portions 89 and 92. During this period of energization a rotatable magnet 93 of the rotor assembly 34 is rotating away from the core portions 88 and 89 and will be repelled by them. A rotatable magnet 94 of the rotor assembly 33 will be rotating away from the core portions 91 and 92 and will be repelled by them. Each of the rotatable magnets of the rotor assemblies 17, 23, 33 and 34 will be repelled by the core portions 88, 89, 91 and 92 as the magnets rotate away from the core portions. The electromagnets of the fixed magnetic shield add to the power output of the motor and a portion of the power generated by these electromagnets is also utilized to replace the losses due to friction and windage in the bearings, gears, and the rotor assemblies and the magnetic attraction of the permanent magnets for the magnetic shields. If the fixed magnetic shield is not utilized, the electromagnets of the rotating magnetic field must be strong enough to overcome the above-identified losses. When the motor is not energized, the rotating magnets and the magnetic shields will assume the position shown in FIG. 2 as the magnetic forces balance. When power is applied the electromagnet windings will be energized to initiate rotation in the directions shown.

In summary, the present invention concerns a permanent magnet motor having rotatable permanent magnets which are repelled by fixed permanent magnets to drive an output shaft. A magnetic shield attached to the output shaft shields the fixed magnet as the rotatable magnet approaches and exposes the fixed magnet as the rotatable magnet passes by. An additional fixed magnet may be provided which is exposed to attract the rotatable magnet as it approaches and is shielded by the magnetic shield as the rotatable magnet passes by. The magnetic shield may have electromagnets formed thereon which are energized and repelled by the second fixed permanent magnet as the magnetic shield rotates away from it to provide additional output power. A fixed magnetic shield is positioned adjacent the rotatable permanent magnets and has electromagnets formed thereon. These fixed electromagnets repel the rotatable permanent magnets for increased output power. During operation of the motor, the electrical input power to the rotatable and/or fixed electromagnets is utilized to overcome the rotational losses due to friction and windage and to generate the output power from the motor due to the interaction between the permanent magnets and the electromagnets.

Figure 6:
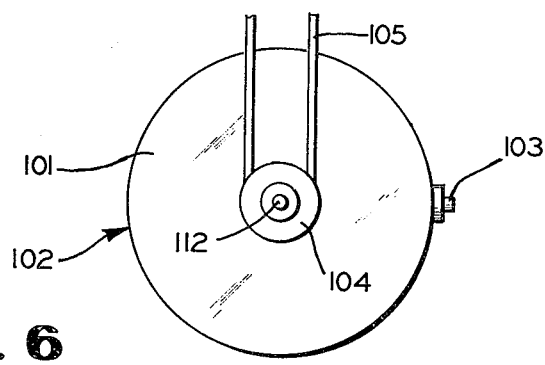
FIG. 6 is a top plan view of an alternate embodiment of the present invention.

FIG. 6 is a top plan view of an alternate embodiment of the present invention showing a permanent magnet motor having a supporting frame comprised of a magnet enclosure 101 and a gear enclosure 102. Extending from the gear enclosure 102 is an auxiliary output shaft 112. Extending from the magnet enclosure 101 is a rotor shaft 112 having a pulley 104 attached thereto. The rotational mechanical power generated by the motor may be transmitted by a belt 105 driven by the pulley 104.

Figure 7:
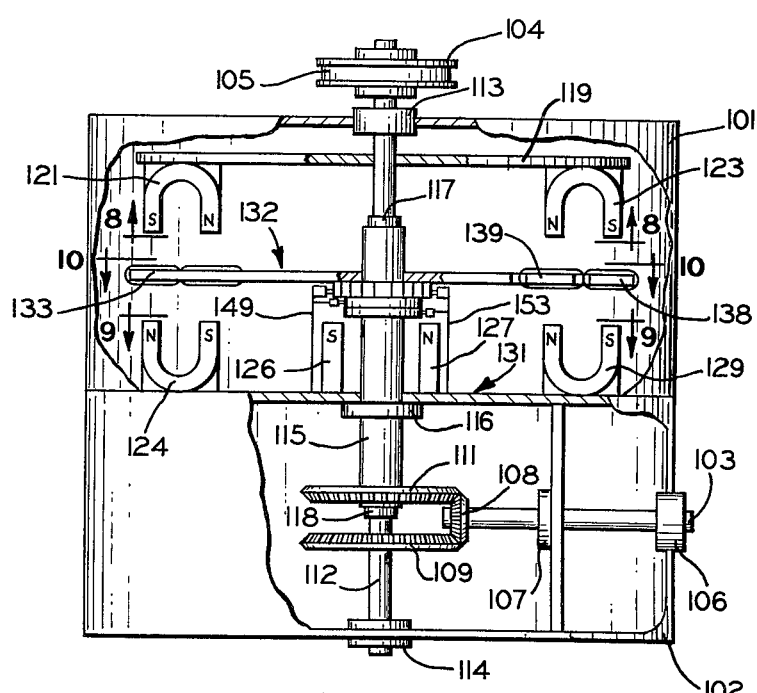
FIG. 7 is a front elevation view of the invention of FIG. 6 with portions broken away.

FIG. 7 is a front elevation view of the motor of FIG. 6 with portions of the magnet enclosure 101 and the gear enclosure 102 broken away to show the internal construction. The output shaft 103 is rotatably supported by a pair of bearings 106 and 107 attached to the gear enclosure 102. A bevel gear 108 is attached to the putput shaft 103 at the end opposite the bearing 106 and engages a pair of bevel gears 109 and 111. Although the bevel gears 109 and 111 are shown as larger than the bevel gear 108, all the gears may be of the same size. The bevel gear 109 is attached to rotor shaft 112 which is rotatably supported by a pair of bearings 113 and 114 which are attached to the magnet enclosure 101 and the gear enclosure 102 respectively. The bevel gear 111 is attached to magnetic shield shaft 115 which is rotatably supported by bearing 116 which is attached to the wall between the magnet enclosure 101 and the gear enclosure 102. A pair of bearings 117 and 118 are attached to the magnetic shield shaft 115 and rotatably support shaft 115 on rotor shaft 112 so that the two shafts are free to turn independently of each other. It will be seen that if the rotor shaft 112 and the bevel gear 109 rotate in a clockwise direction when viewed from the top of the magnet enclosure 101, then the shield shaft 115 and the bevel gear 111 must rotate in the counter clockwise direction to drive the output shaft 103 in a clockwise direction as viewed from the end supported by the bearing 106.

Figure 8:
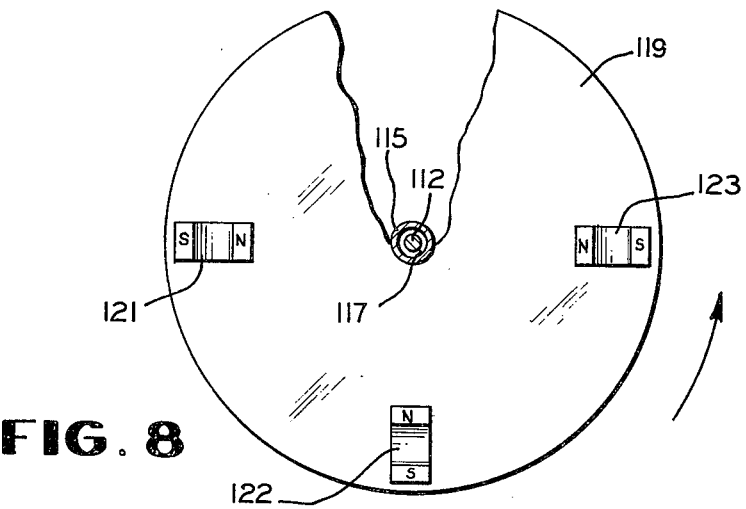
FIG. 8 is a fragmentary sectional view of the movable magnets taken along line 8—8 of FIG. 7.
Figure 9:
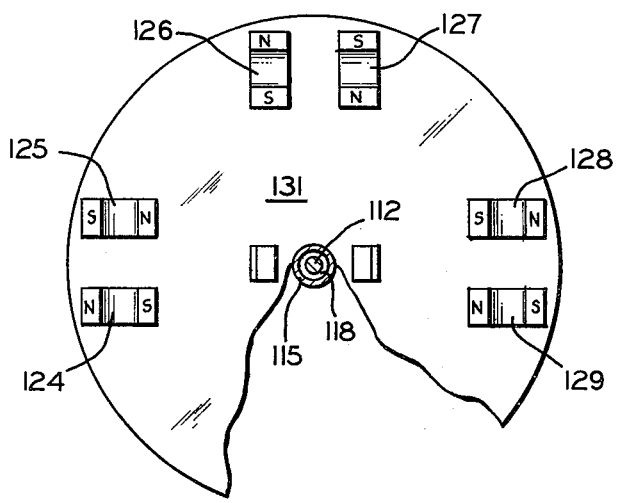
FIG. 9 is a fragmentary sectional view of the fixed magnets taken along line 9—9 of FIG. 7.

FIG. 8 is a fragmentary sectional view of the rotor assembly as shown in FIG. 7 and FIG. 9 is a fragmentary sectional view of the fixed magnet assembly as shown in FIG. 7. In FIG. 8, a circular rotor plate 119 with a portion cut away is attached to the rotor shaft 112 and rotates in a counter clockwise direction as viewed in the direction of the arrows of line 8—8 in FIG. 7. Attached to the rotor plate 119 are three horseshow-shaped permanent magnets 121, 122, and 123 and a fourth magnet (not shown) opposite the magnet 122 spaced apart by 90°. Each of the magnets has its north pole adjacent the rotor shaft 112 and its south pole adjacent the circumferential edge of the rotor plate 110. In FIG. 9, three pairs of horseshoe-shaped permanent magnets 124 and 125, 126 and 127, 128 and 129 and a fourth pair (not shown) are attached to a wall 131 between the magnet enclosure 101 and the gear enclosure 102. The magnet pairs are also spaced apart by 90° and are positioned so that the poles of the magnets 121, 122 and 123 pass over the poles of the fixed magnets.

Figure 10:
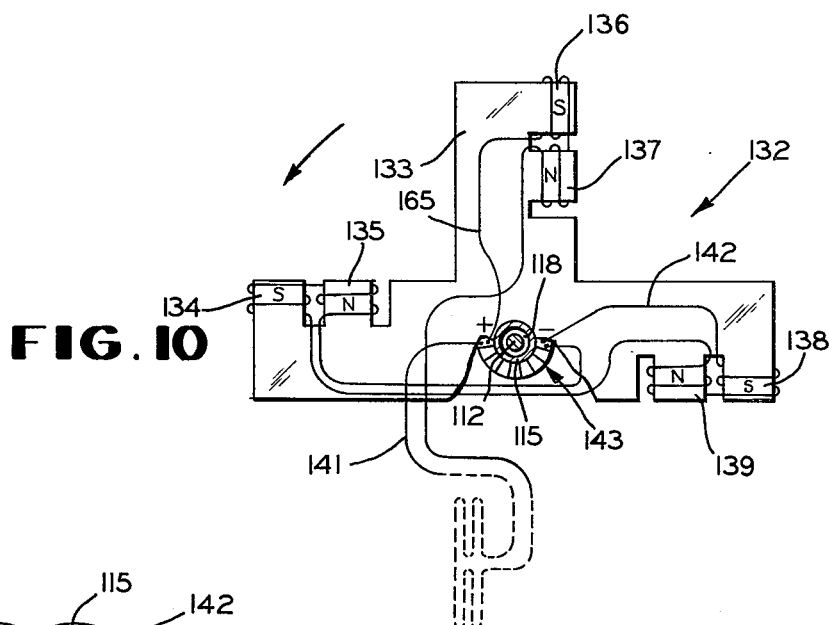
FIG. 10 is a fragmentary sectional view of the movable magnetic shield taken along line 10—10 of FIG. 7.

The fixed magnets 125, 127, 129 and a fourth magnet (not shown) have their north poles adjacent the shield shaft 115 and their south poles adjacent the side wall of the magnet enclosure 101. Therefore, the fixed magnets 125, 127 and 129 will repel the rotatable magnets 121, 122 and 123. A magnetic shield 132 which rotates in a direction opposite to the rotor plate 119 passes through the air gap between the fixed and rotating magnets. FIG. 10 shows the magnetic shield 132 which rotates in a counter clockwise direction as viewed from the top of the magnet enclosure 101 to shield the fixed magnets 125, 127 and 129 as the rotatable magnets 121, 122 and 123 approach them. Then as the magnets 121, 122 and 123 rotate past the fixed magnets the magnetic shield 132 rotates in the opposite direction to expose the fixed magnets which repel the rotatable magnets and impart motion to the rotor plate 119. The fixed magnets 124, 126 and 128 may be added to increase the output power of the motor. Each of the magnets 124, 126, 128 and a fourth magnet (not shown) has its south pole adjacent the shield shaft 115 and its north pole adjacent the side wall of the magnet enclosure 101. As the rotatable magnets 121, 122 and 123 approach the fixed magnets 124, 126 and 128 they are attracted and rotational motion is imparted to the rotor plate 119. When the rotatable magnets move past the fixed magnets, the fixed magnets 124, 126 and 128 are shielded by the magnetic shield 132. This alternate attraction and repulsion of the rotatable magnets produces the output power of the motor.

The magnetic shield 132 is comprised of a shield plate 133 having three pairs of electromagnetic core portions, 134 and 135, 136 and 137, 138 and 139 and a fourth pair (not shown) formed thereon. The shield plate 133 is attached to the shield shaft 115 and rotates therewith so that the core portions 135, 137 and 139 pass over the poles of the fixed magnets that are adjacent the shield shaft 115 and the core portions 134, 136 and 138 pass over the poles of the fixed magnets that are adjacent the side wall of the magnet enclosure 101. Each of the core portions has a winding and these windings are connected in series to a direct current power source (not shown) by a pair of input leads 141 and 142 and a commutator 143.

Figure 11:
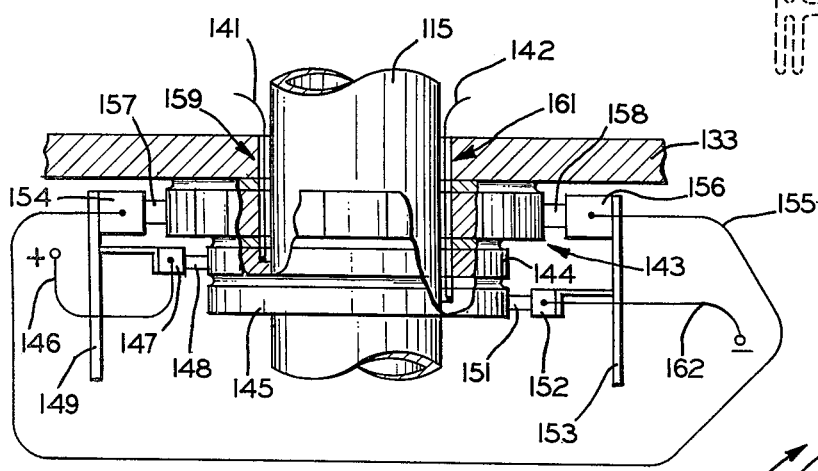
FIG. 11 is a fragmentary front elevation view of the commutator and slip rings of FIG. 7 with portions broken away.

Referring to FIG. 11, there is shown a fragmentary front elevation view of a commutator 143 and a pair of slip rings 144 and 145 through which electric current is supplied to the electromagnets of the magnetic shield 132. A power input lead 146 is connected between the positive terminal of the power source (not shown) and a brush holder 147 which retains a brush 148. The brush holder 147 is supported by a bracket 149 which is attached to the wall 131 between the magnet enclosure 101 and the gear enclosure 102 as shown in FIG. 7. The electric current will flow from the brush 148 through the slip ring 145 and the windings to a brush 151. The brush 151 is retained by a brush holder 152 which is supported by a bracket 153 attached to the wall 131 as shown in FIG. 7. The bracket 149 also supports a brush holder 154 which is electrically connected by a lead 155 to another brush holder 156. The brush holders 154 and 156 retain a pair of brushes 157 and 158 respectively which contact the commutator 143. The input lead 141 from the magnetic shield 132 is electrically connected to slip ring 144 and passes through a channel 159 in the slip ring 144, the commutator 143 and the shield plate 133 along the shield shaft 115.

The input lead 142 from the magnetic shield 132 passes through a channel 161 in the shield plate 133, the commutator 143, the slip ring 144 and the slip ring 145 where it is electrically connected to the slip ring 145. The brush holder 152 is electrically connected to a power input lead 162 which in turn is connected to the negative terminal of the power supply (not shown). The current flowing into the brush 148 from the positive terminal will flow through the slip ring 144 and the input lead 141 to the windings on the core portions of the shield plate 133. After the current flow through electromagnet windings it will return to the power supply through the input lead 142, the slip ring 145, the brush 151, the brush holder 152 and the power input lead 162.

Figure 12:
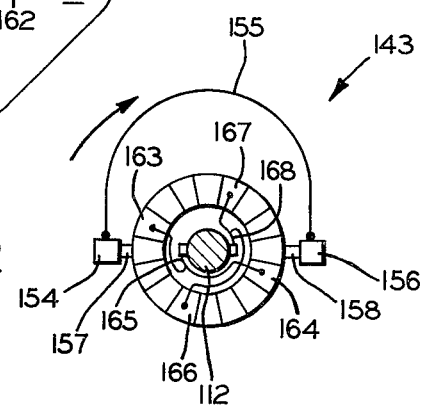
FIG. 12 is a fragmentary bottom plan view of the commutator of FIG. 11.

Referring to FIG. 12, there is shown the commutator 143 in bottom plan view. The commutator 143 is attached to the rotor shaft 112 and has a plurality of commutator bars which are insulated from one another. For purposes of illustration, the commutator 143 is shown with sixteen commutator bars. However, more or less bars may be utilized to change the portions of the path of rotation during which the commutator will pass current to the electromagnet windings. A pair of commutator bars 163 and 164 are electrically connected together by a lead 165 to the windings of the magnetic shield 132. The two bars are positioned on opposite sides of the commutator to provide an arc of 22.5° during which brushes 157 and 158 will contact these bars and current will flow through the commutator 143 every one-half revolution of the rotor shaft 112. A second pair of commutator bars 166 and 167 are also electrically connected together by a lead 168 to the windings of the magnetic shield 132. These two commutator bars are spaced between the first and second bars and also provide an arc of 22.5° during which the brushes 157 and 158 will contact these bars. Therefore, the commutator 143 will conduct current during a 22.5° arc of each 90° portion of the path of rotation of the commutator 143.

Referring to FIGS. 9, 10 and 12, the commutator 143 has four commutator bars 163, 164, 166 and 167 which are connected to each other and insulated from the rest of the commutator bars. The commutator bars 163, 164, 166 and 167 are spaced apart by 90° and coincide with the positions of the core portions of the shield plate 133. Therefore, the electromagents of the magnetic shield 132 will be energized during a 22.5° arc as the core portions of the magnetic shield 132 rotates past the fixed magnet positions and the electromagnets will be turned off during a 67.5° arc when the core portions rotate between the fixed magnet positions. The electromagnet windings are energized to produce a south pole at the core portions 134, 136 and 138 and a north pole at the core portions 135, 137 and 139. The core portions will be attached by the fixed magnets 124, 126 and 128 and will be repelled by the fixed magnets 125, 127 and 129 to impart rotary motion to the magnetic shield 132 to increase the output power of the motor. A portion of the power generated by the interaction between the fixed permanent magnets and the electromagnets is also utilized to overcome the rotational losses due to friction and windage and the attraction of the magnetic shield to the magnets.

In summary, the alternate embodiment of the present invention has rotatable permanent magnets which are repelled by fixed permanent magnets to drive an output shaft. A magnet shield rotates concentrially with the rotating magnets but in the opposite direction to shield the fixed magnet as the rotatable magnet approaches and to expose the fixed magnet as the rotatable magnet passes by. An additional fixed magnet may be provided which is exposed to attract the rotatable magnet as it approaches and is shielded by the magnetic shield as the rotatable magnet passes by. The magnetic shield has electromagnets formed thereon which are energized to be repelled by the first fixed magnet as it passes by and attracted by the second fixed magnet as it approaches. The electrical input power to the electromagnets if utilized to overcome the rotational losses due to friction and windage and to generate the output power from the motor due to the interaction between the permanent magnets and the electromagnets. Since the motor will assume the position shown in FIGS. 8, 9 and 10 when the power is off as the magnetic forces balance, the motor will start when the power is applied as the electromagnet windings are energized to repel the magnetic shield 132 from the fixed magnets 125, 127 and 129.

While there is explained and illustrated the preferred embodiments of my invention, it is to be understood that within the spirit and the scope of the following claims the invention may be practiced otherwise than as specifically illustrated and described.

I claim:
1. A permanent magnet motor comprising:
   a supporting frame;
   an output shaft rotatably attached to said frame;
   a first permanent magnet means fixedly attached to said frame;
   a second permanent magnet means in driving relationship with said shaft and rotatably attached to said frame for movement along a predetermined circular path whereby said permanent magnet means repel each other to generate movement in opposite directions along a first portion of said predetermined path; and
   a magnetic shield coupled to said shaft and rotatably attached to said frame wherein said shield is driven between said first and second permanent magnet means when said first and second permanent magnet means are substantially adjacent each other along a second portion of said predetermined path.
2. A motor as described in claim 1 wherein said first and second permanent magnet means attract each other to generate movement toward each other along a third portion of said predetermined path.

3. A motor as described in claim 1 wherein said magnetic shield and said first and second permanent magnet means attract each other.

4. A motor as described in claim 1 wherein said magnetic shield includes electromagnet means having means to energize selectively said electromagnet whereby during travel beyond said second portion of said predetermined path said first permanent magnet means and said magnetic shield repel each other.

5. An electromagnetic machine, comprising:
a supporting frame;
an output shaft rotatably attached to said frame;
a first plurality of permanent magnet means fixedly attached to said frame;
a second plurality of permanent magnet means in driving relationship with said shaft and rotatably attached to said frame for movement along predetermined circular paths whereby at least one of said first plurality of permanent magnet means and at least one of said second plurality of permanent magnet means repel each other to generate movement in opposite directions along a first portion of each of said predetermined paths; and
at least one magnet shield coupled to said shaft wherein said shield moves between said one of said first plurality of permanent magnet means and said one of said second plurality of permanent magnet means when said one of said first plurality and said one of said second plurality are substantially adjacent each other along a second portion of the predetermined path of said one of said second plurality of permanent magnet means.

6. An electromagnetic machine as described in claim 5 wherein said one of said first plurality of permanent magnet means and said one of said second plurality of permanent magnet means attract each other to generate movement toward each other along a third portion of the predetermined path of said one of said second plurality.

7. An electromagnetic machine as described in claim 5 wherein said magnetic shield is fixedly attached to said shaft.

8. An electromagnetic machine as described in claim 5 including a fixed magnetic shield attached to said frame between at least two of said second plurality of permanent magnet means.

9. An electromagnetic machine as described in claim 7 wherein said fixed magnetic shield includes electromagnet means and means to energize selectively said electromagnet means whereby during travel beyond said fixed magnetic shield said two permanent magnet means and said fixed magnetic shield repel each other.

10. An electromagnetic machine as described in claim 6 wherein said one of said first plurality of permanent magnet means includes a first pair of magnetic poles of one polarity and a second pair of magnetic poles of the opposite polarity.

11. An electromagnetic machine as described in claim 10 wherein said one of said second plurality of permanent magnet means includes a first magnetic pole of said one polarity which is repelled by said first pair of magnetic poles and attracted by said second pair of magnetic poles and a second magnetic pole of said opposite polarity which is attracted by said first pair of magnetic poles and repelled by said second pair of magnetic poles.

* * * * *